May 19, 1953  H. W. ROEBER  2,639,034
CUP ORIENTING DEVICE
Filed April 30, 1948  2 Sheets-Sheet 1
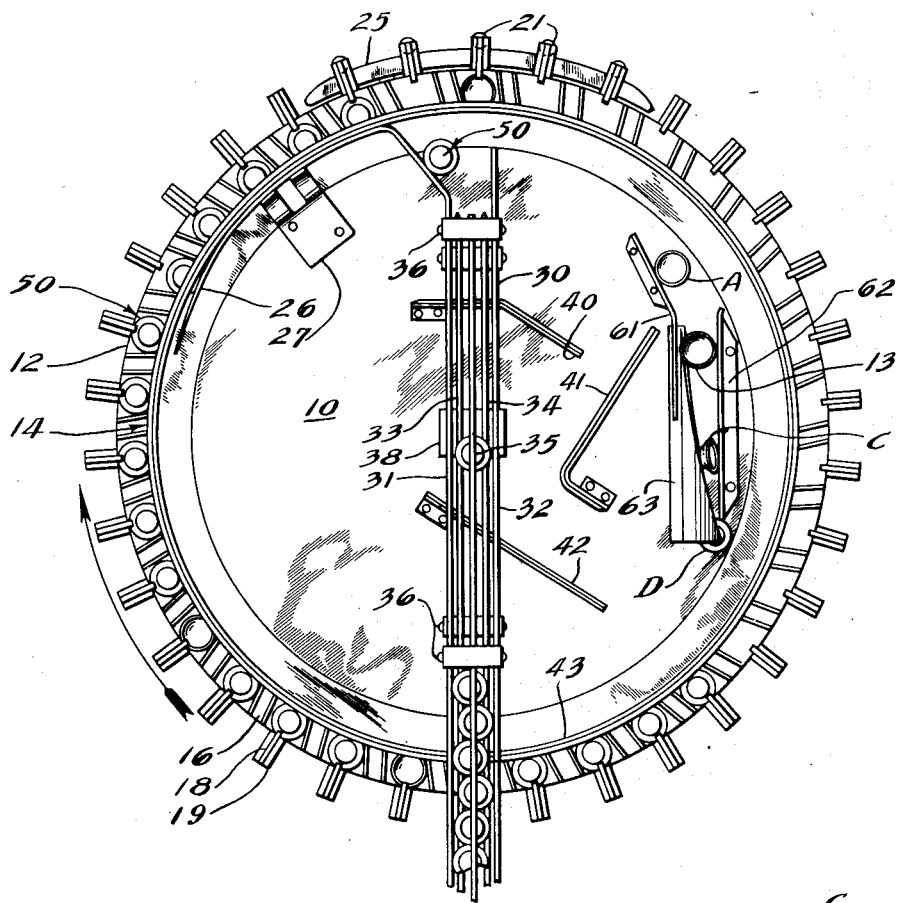
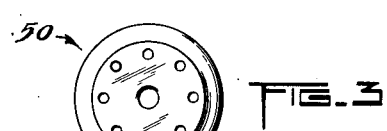
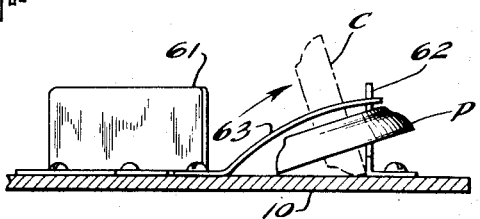
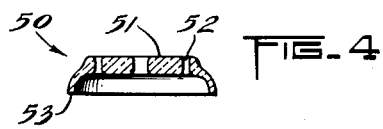
INVENTOR.
Henry W. Roeber
BY A. L. B. Richardson
Attorney May 19, 1953 H. W. ROEBER 2,639,034
CUP ORIENTING DEVICE
Filed April 30, 1948 2 Sheets-Sheet 2
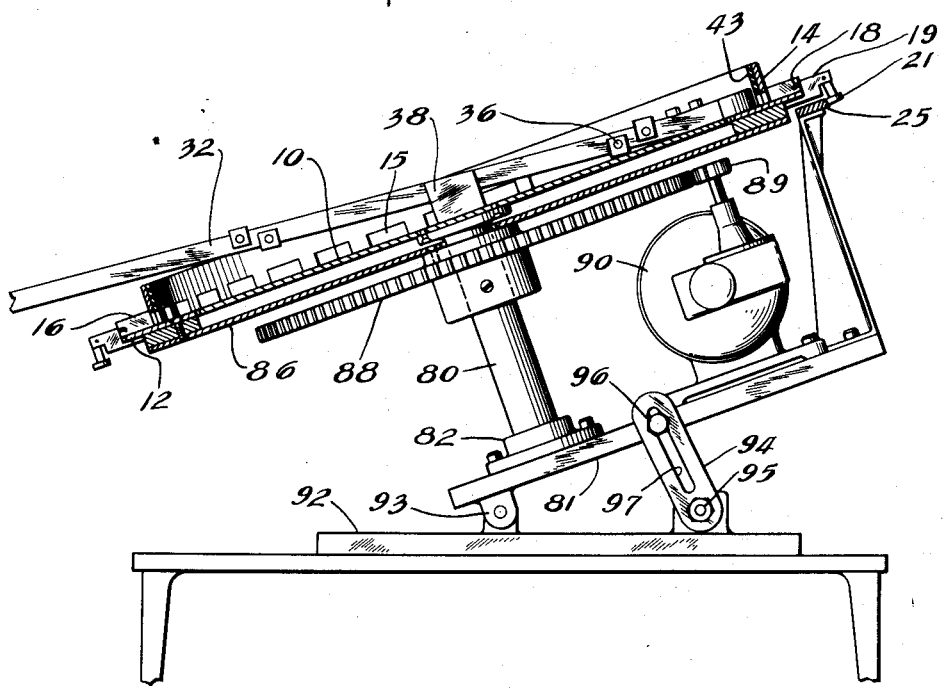
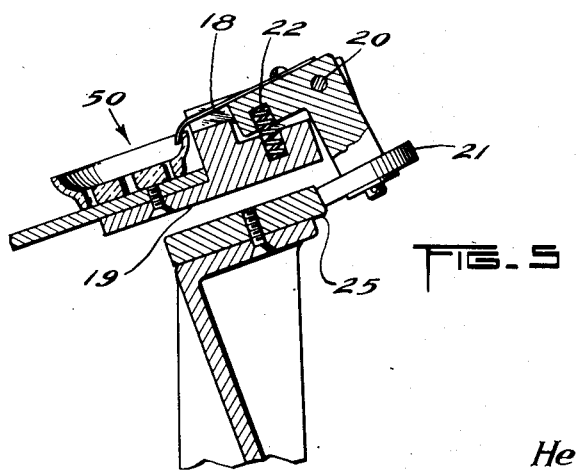
INVENTOR.
Henry W. Roeber
BY A. L. B. Richardson
Attorney Patented May 19, 1953

2,639,034

UNITED STATES PATENT OFFICE 2,639,034

CUP ORIENTING DEVICE

Henry W. Roeber, Emporium, Pa., assignor to Sylvania Electric Products Inc., a corporation of Massachusetts Application April 30, 1948, Serial No. 24,212

3 Claims. (Cl. 209—72)

The present invention relates to article handling devices, and more particularly to an arrangement for feeding a series of small articles into a dispensing rack or chute.

An object of the present invention is the provision of an article handling device for removing the articles one at a time from a reservoir and inserting them in a single relationship into a dispensing rack from which the articles may be delivered for further processing or use.

Another object of the present invention is the provision of a device for taking small glass cups from a reservoir and feeding them all the same way up into a dispensing chute.

Still another object of the present invention is the provision of a cup handling device for feeding cups into a dispensing chamber, said device being adapted to release only the cups which are the right way up into the dispensing chute, and releasing the cups which are the wrong side up into a device for turning them over and again presenting them for release into the dispensing chute.

Still another object of the present invention is the provision of a machine for picking glass header cups for radio tube manufacture out of a reservoir, and presenting them all the same way up to a dispensing chute.

Still a further object of the present invention is the provision of a cup handling machine, particularly adapted to handle fragile or frangible objects.

The foregoing objects and others which may appear from the following detailed description are attained by providing a reservoir for the cups to be handled having a padded rotatable outer rim. The reservoir is tilted at an angle so the cups tend to fall toward the lower part of the reservoir. The rotatable outer rim has a plurality of apertures therein, each of a size adapted to receive one of the cups to be handled. At the lower side of the reservoir, the cups slide into the apertures, and as the rim rotates, the cups are carried up to the higher side of the reservoir. There, if the cup is the right way up it is released for delivery into a dispensing chute. On the other hand, if the cup is the wrong way up, with the cupped surface uppermost, a cam actuated holding finger is depressed to hold the cup from release at the time when it would normally slide into the dispensing chute. Once the cup has passed the zone where it would slide into the dispensing chute, the cam causes the finger to be released whereby the cup is delivered into a chute arrangement which turns the cup over and releases it again to the lower side of the reservoir so that it can slide into one of the apertures in the rotatable rim. In the event the delivery chute is full so that no more cups can slide into the delivery chute, the cup is carried on by the entrance to the delivery chute and is allowed to slide back again into the reservoir. In order that the speed of travel of the cup may be kept below that which would cause chipping or breakage, a number of padded baffles are provided in the path of the cup so that its final velocity as it joins the remainder of the cups in the reservoir is not excessive.

The present invention will be more fully understood by reference to the following detailed description which is accompanied by a drawing in which Fig. 1 illustrates, in an angular plan view, an embodiment of the present invention, while Fig. 2 illustrates in vertical cross-section a side view of the device of Fig. 1.

Figs. 3 and 4 illustrate, in plan view and in transverse cross-section, a cup of the type which the machine of the present invention is adapted to be operated, while Fig. 5 is a transverse sectional view of one of the cup retaining finger arrangements of the machine of Figs. 1 and 2, and Fig. 6 is a fragmentary view along lines 6—6 of Fig. 1 showing the way in which the cup inverting chute operates.

Referring now to Fig. 1 there is shown at 10 a stationary circular base plate inclined at a slight angle, indicated in the sectional view in Fig. 2. Surrounding the circular base plate 10 is a rotatable ring 12 having attached thereto a vertical upstanding apertured rim 14. The upstanding rim 14, as shown more clearly in Fig. 2, has a plurality of apertures 15 in its lower portion. Each of the apertures 15 is just wide enough and just high enough to receive one of the glass cups adapted to be handled by the machine. A cup 50 is shown in plan view in Fig. 3 and in transverse section in Fig. 4. Each cup has one substantially flat face 51 pierced by a number of holes 52 and an upstanding rim 53 about the other face.

The portion of ring 12 outside of rim 14 is divided into a number of individual chambers by dividers 16. They are attached to the ring 12 by suitable means, not shown, at a slight angle, such that at the left hand side of Fig. 1 the cups tend to remain in the chambers thus formed, rather than falling out as the rings rotate.

Each of the cup retaining chambers on ring 12 is provided with a cup holding finger 18 supported on a mounting block 19. The cup retaining finger arrangement is shown in more detail in Fig. 5. The retaining finger 18 is pivotally mounted on pivot 20 in the bracket 19 and carries at its lower end a cam roller 21. The cup engaging end of finger 18 is normally urged upwardly to an inoperative position by a spring 22. From an inspection of Fig. 5 it will be seen that if cup 50 is inverted, that is, has its concave surface upward, the cup retaining finger will hold the cup 50 in position while the cam roller 21 is in contact with the surface of cam 25. The cup 50 is then not released into the delivery chute at the top of its path of travel. However, if the cup is the other side up, with the concavity downward, the spring finger 18 will not hold the cup and as the cup reaches the top of its orbit, it will slide out of the cup retaining chambers into the dispensing chute 30.

In order to insure that each of the cups 50 is far enough into the cup receiving chamber on ring 12 to be gripped by the spring finger 18, in the event this is necessary, a resilient guide wall 26, supported by bracket 27 from the stationary base plate 10, follows the arc of curvature of the rim 14 for a portion of its circumference. Thus, as the cups approach the region near the end of spring finger 26, if they are not entirely within the cup receiving cavities in ring 12, they will be either pushed entirely into the chamber or pushed out of the chamber altogether to slide back into the general reservoir. As each cup receiving chamber approaches the top of its orbit of travel, the force of gravity tends to urge the cups which are right side up, that is, with the concavity downward, and thus not held by spring finger 18, into the cup dispensing chute 30. The floor of cup receiving and dispensing chute 30 gradually emerges from the plane of the stationary base plate 10 at its top end, and being inclined at a slightly lesser angle to the horizontal than base plate 10, the chute passes over the top of rim 14 at the lower side thereof, as shown in Fig. 2.

A preferred form of cup receiving chute is shown in Figs. 1 and 2 and may consist of a pair of parallel side bar members 31 and 32, a pair of lower rod-like members 33 and 34, and a top rod member 35, all maintained in position by U-shaped brackets 36. At the center of stationary base plate 10 is provided a supporting block 38 for holding the cup receiving and dispensing chute 30 rigidly in its desired position.

In the event the delivery chute 30 is full of cups, the cups as released from the individual cup receiving chambers on ring 12 are carried to the right of chute 30 (Fig. 1) and slide over the surface of plate 10 down to the bottom side of the reservoir to be picked up by another cup receiving chamber. Since the cups 50 are made of glass and are relatively fragile, it is not desirable that the cups be allowed to fall free across a diameter of the base plate 10, so a plurality of spring fingers 40, 41 and 42, are secured to the base plate 10 in such a manner as to provide a tortuous path for the fall of the cups. Preferably, the upper faces of each of the fingers 40, 41 and 42, and the entire interior of ring 14, are lined with a resilient material, indicated at 43, in order to prevent chipping of the cups. The cups which arrive at the upper side of the rotating outer ring 12, with the concave side up, are held, as explained previously, by the cup retaining fingers 18 until they have passed beyond the zone in which they would fall either into the dispensing chute 30, or against spring finger 40. Beyond the end of cam 25 the cups are released by the action of spring 22 lifting the cup retaining finger 18. The cups thus released slide into a cup reversing chute including a first side wall member 61, a second side wall member 62, and a third side wall member 63. The adjacent edges of side wall members 62 and 63 are provided with cam surfaces, whereby one edge of the cups falling therethrough is gradually lifted and the cup eventually turned over.

This action is illustrated in Figs. 1 and 6 by a plurality of cups A, B, C and D in successive positions along the turnover chute. In Fig. 1 cup A is being directed by an extension of wall 61 into the turnover chute, while cup B is just beginning to ride up on the curved ramp surface of wall 63. Cup C is further lifted, almost to a vertical position, while at position D the cup is turned clear over away from the ramp surface of wall 63 and is now riding on wall 62. In Fig. 6, which is an end view of the turnover chute arrangement, the cup C is indicated in dotted lines as being lifted to nearly a vertical position, while the cup at D in Fig. 6 is riding only on wall 62 and is clear of the cam face of wall 63. Wall 63 has a constantly decreasing height toward its lower end while the curved ramp surface of wall 62, along this portion of the chute, actually overlies wall 63.

Fig. 2 shows clearly how the base plate 10 is supported in a stationary position on a support pedestal 80 on a tiltable base plate 81 by means of flange 82. The outer ring 12 is carried on an underplate 86, which is attached to a large gear 88 driven from a pinion 89 and a motor 90, also supported on the base plate. Base plate 81 is hinged to the main base 92 by hinges 93. The desired angular position therebetween is maintained by means of a slotted link 94 pivoted to the main base 92 at 95, and clamped to the base plate 81 with a clamping screw 96. By loosening clamp screw 96 so that it will slide along the slot 97 in the slotted link 94, a desired angular arrangement of the device with respect to the horizontal is obtained, after which the clamping screw 96 may be tightened, thus maintaining the desired angular relationship.

What is claimed is:

1. An article handling arrangement adapted to deliver cup shaped articles into a dispensing chute and including a tilted reservoir having an upstanding rim rotatable in an orbit around a stationary plate, said rim including a number of article receiving chambers, the side walls of said chambers being skewed so that articles picked up by said chambers at the lower portion of said orbit are not released until said chambers substantially reach the top of said orbit and a dispensing chute having its floor merging with said plate at its upper end and passing over said rim at the lower part of said orbit, a cup-engaging finger individual to each of said chambers, a cam at the top portion of the orbit of said rim for moving said fingers so that they enter the hollow of those of said articles which have their hollow sides up, said chute being adapted to receive articles released from said chambers at the top of said orbit, said cam thereafter releasing said fingers whereby the held cups are released into said reservoir and means for retarding the fall across said disc of said articles.

2. A cup handling device including a number of cup carrying chambers adapted to pass by a number of successive stations at the top of an inclined plane, means permitting the release of said cups which have their concave faces down at the first of said stations into a cup dispensing chute, said means including cam-operated fingers individual to said chambers and adapted to engage only those cups which have their concave faces up, means for retarding the fall over said surface of said cups which do not enter said chute, said fingers being cam actuated to disengage said cups for releasing said cups which have their concave faces up at another station into a cup reversing chute, said cup reversing chute including a number of upstanding walls forming a chute along said surface, one of said walls decreasing in height along its length, another wall increasing in height along its length and being bent over the lower portion of said one wall, and a third wall at the upper end of said other wall for guiding said cups into the space between said one wall and said other wall.

3. An article handling arrangement adapted to deliver a number of shallow cups into a dispensing chute and including a tilted reservoir having a rotatable rim, said rim including a number of cup receiving chambers, means for rotating said rim, a cup-engaging finger individual to each of said chambers, a cam at the top portion of the orbit of said rim for moving said fingers so that they enter the hollow of those of said cups which have the hollow side up whereby such cups are retained in said chambers, means for delivering said cups which are not retained by said fingers into said dispensing chute and said cam being adapted to release said cups which are held by said fingers into a second chute, said second chute being provided with side walls adapted to turn over said cups received thereby and means for delivering said turned-over cups into said reservoir.

HENRY W. ROEBER.

References Cited in the file of this patent
UNITED STATES PATENTS

| Number | Name | Date |
|---|---|---|
| 188,053 | Hinchman | Mar. 6, 1877 |
| 245,409 | Sheldon | Aug. 9, 1881 |
| 613,349 | Woodland | Nov. 1, 1898 |
| 887,298 | Wilmore | May 12, 1908 |
| 1,053,634 | Nagy | Feb. 18, 1913 |
| 1,277,782 | Tucker | Sept. 3, 1918 |
| 1,358,725 | Gaynor | Nov. 16, 1920 |
| 1,456,546 | Gleason | May 29, 1923 |
| 1,480,898 | Denmire | Jan. 15, 1924 |
| 1,538,122 | Kurtz | May 19, 1925 |
| 1,572,219 | Mudd | Feb. 9, 1926 |
| 2,060,182 | Dellaree | Nov. 10, 1936 |
| 2,176,659 | Mundy | Oct. 17, 1939 |
| 2,433,561 | Angell | Dec. 30, 1947 |